Patented Oct. 25, 1938

2,134,654

UNITED STATES PATENT OFFICE 2,134,654

COMPOUNDS OF THE ANTHRAQUINONE SERIES

Ralph N. Lulek, Milwaukee, Wis., assignor to E. I. du Pont de Nemours & Company, Wilmington, Del., a corporation of Delaware No Drawing. Application December 22, 1937, Serial No. 181,163

3 Claims. (Cl. 260—380)

This invention relates to the preparation of new compounds of the anthraquinone series, and has for its object the preparation of 6- and 7-halogen-1-aminoanthraquinone compounds of the class illustrated by the formula

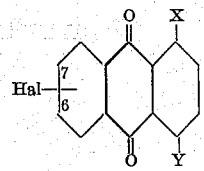

wherein X stands for $NH_2$ and NH-alkyl, Y stands for $NH_2$ and OH, and Hal stands for chlorine and bromine in one of the positions 6 and 7, which compounds are valuable as dyes for cellulose acetate silk and as intermediates for the preparation of dyes for other fibers.

The compounds of my invention may be prepared from the 6- and 7-halogen-anthraquinones which carry in the 1-position an amino, hydroxy, or alkylamino group. By nitration and subsequent reduction the corresponding 4-amino compounds may be obtained and they in turn may be converted to the alkylamino compounds by alkylation in sulfuric acid. Alternatively, the 1-alkylamino-4-amino-6-(or 7-)halogen-anthraquinone may be prepared from the 1-alkylamino-6-(or 7-)halogen-anthraquinone by amidating the 4-halogen derivative. In the preparation of the 1,4-diamino-6-(or 7-)halogen-anthraquinones the 1-amino compound is preferably converted to the oxaminic acid derivative which is then nitrated, reduced, and hydrolyzed.

The new halogen containing aminoanthraquinone compounds give deeper shades than the corresponding non-halogen containing compounds, when employed in the dyeing of cellulose acetate and related fibers, and are therefore a valuable addition to this class of dyestuffs. They also serve as intermediates for the preparation of vat dyes.

The following examples are given to illustrate the preparation of these new compounds. The parts used are by weight.

Example 1

44 parts of 1-hydroxy-6-chloroanthraquinone (which may be obtained by diazotizing 1-amino-6-chloroanthraquinone and hydrolyzing the diazonium compound) are dissolved at room temperature in a mixture of 307 parts of sulfuric acid monohydrate and 12.7 parts of boric acid which has been heated previously to 110° C. The solution is heated to 50 to 55° C. and maintained for one-half hour. After cooling to 0 to 5° C. 37.5 parts of mixed acid containing 34% of nitric acid are added over a period of two hours. The nitration mass is maintained at 10 to 15° C. for three hours, drowned in ice water, boiled, filtered, and washed acid-free.

The nitro compound may be crystallized from o-dichlorobenzene.

The reduction to the 1-amino-4-hydroxy-7-chloroanthraquinone is carried out by suspending the nitro compound in 500 parts of water with addition of 8 parts of flaked sodium hydroxide and 160 parts of sodium sulfide solution (16%).

The mass is heated to 90 to 95° C. for one hour, filtered, washed with hot water, and the cake acidified by slurrying with dilute hydrochloric acid at the boil. The melting point of this 1-amino-4-hydroxy-7-chloroanthraquinone is 268.5–269.8° C.

The product dyes acetate silk in bluish red shades somewhat bluer than the 1-amino-4-hydroxyanthraquinone.

Example 2

If in the foregoing example the 1-hydroxy-6-chloroanthraquinone is replaced by the 1-hydroxy-7-chloroanthraquinone (which may be obtained from 1-amino-7-chloroanthraquinone by diazotization and hydrolysis or by treating 7-chloro-1-anthraquinonesulfonic acid with calcium hydroxide under pressure), one obtains the 1-amino-4-hydroxy-6-chloroanthraquinone which shows similar properties to the 7-chloro isomer.

Example 3

200 parts of 1-amino-6-chloroanthraquinone, 600 parts of phenol and 300 parts of dry oxalic acid are heated to 135 to 140° C. and held at this temperature for two hours. The mass is cooled to 100° C., diluted with 2000 parts of alcohol and filtered, washed with alcohol and hot water, and dried.

216 parts of this 6-chloro-1-anthraquinoneoxaminic acid are dissolved in 2160 parts of concentrated sulfuric acid at 0 to 5° C. and a mixture of 57.3 parts of nitric acid (79%) and 114 parts of concentrated sulfuric acid is added at this temperature. The mass is stirred at 0 to 5° C., drowned in 9000 parts of water, filtered, washed free from acid, and the cake suspended in 7000 parts of water. To this slurry are added 175 parts of flaked caustic soda and the suspension is heated to 90 to 95° C. for 2 to 3 hours. The product is filtered, washed alkali-free and the cake suspended in 5000 parts of water. 550 parts of a 30% sodium sulfhydrate solution are added and the mass heated to 90 to 95° C. for 3 hours. The resulting 1,4-diamino-6-chloroanthraquinone is filtered, washed with hot water, and dried. The product dyes acetate silk in bright violet shades much bluer than the 1,4-diaminoanthraquinone and has excellent fastness to light. It may be used also as an intermediate for the preparation of new vat dyes.

*Example 4*

23 parts of 1-methylamino-4-bromo-6-chloroanthraquinone (obtained by bromination of 1-methylamino-6-chloroanthraquinone in nitrobenzene) are heated with 230 parts of cyclohexanol, 20 parts of p-toluenesulfonamide, 10 parts of potassium acetate and 0.5 part of copper acetate, to reflux temperature for five hours. The mass is diluted with alcohol, filtered, washed, and dried.

This 1-methylamino-4-p-toluenesulfamino-6-chloroanthraquinone is converted to the 1-methylamino-4-amino-6-chloroanthraquinone by dissolving in concentrated sulfuric acid and precipitating with water. It dyes acetate silk in blue shades of good fastness properties.

The same compound may be obtained also by reducing 1-methylamino-4-nitro-6-chloroanthraquinone (obtained by nitration of 1-methylamino-6-chloroanthraquinone) with sodium sulfhydrate solution.

The corresponding 1-ethylamino-4-amino-6-chloroanthraquinone and the higher homologues may be prepared by this same procedure.

I claim:

1. Compounds of the anthraquinone series having the general formula

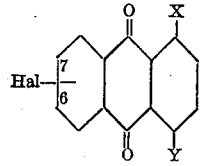

wherein X represents a substituent of the group consisting of $NH_2$ and NH-alkyl, Y stands for a substituent of the class consisting of $NH_2$ and OH, and Hal stands for a halogen of the group consisting of chlorine and bromine which is attached to one of the positions 6 and 7.

2. 1,4-diamino-6-chloranthraquinone.

3. 1-methylamino-4-amino-6-chloroanthraquinone.

RALPH N. LULEK.